(12) United States Patent
Matsuda et al.

(10) Patent No.: US 7,406,175 B2
(45) Date of Patent: Jul. 29, 2008

(54) KEY GENERATOR DEVICE, ENCODING/DECODING DEVICE, AND KEY GENERATION METHOD

(75) Inventors: Hiromi Matsuda, Kanagawa (JP); Eiichiro Morinaga, Tokyo (JP); Masao Tanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 769 days.

(21) Appl. No.: 10/481,466

(22) PCT Filed: Apr. 17, 2003

(86) PCT No.: PCT/JP03/04915

§ 371 (c)(1),
(2), (4) Date: Dec. 19, 2003

(87) PCT Pub. No.: WO03/090185

PCT Pub. Date: Oct. 30, 2003

(65) Prior Publication Data

US 2004/0161106 A1 Aug. 19, 2004

(30) Foreign Application Priority Data

Apr. 19, 2002 (JP) ............................. 2002-118509

(51) Int. Cl.
*H04L 9/22* (2006.01)
(52) U.S. Cl. .......................................... 380/46; 380/47
(58) Field of Classification Search .................. 380/44, 380/46, 47, 277; 708/250
See application file for complete search history.

(56) References Cited

U.S. PATENT DOCUMENTS 5,598,154 A * 1/1997 Wilson et al. .................. 341/50
6,947,558 B1 * 9/2005 Graunke et al. ............... 380/37
6,961,426 B2 * 11/2005 Vesely .......................... 380/42

FOREIGN PATENT DOCUMENTS

| JP | 1-206718 | 8/1989 |
|---|---|---|
| JP | 2-43594 | 2/1990 |
| JP | 2-177743 | 7/1990 |
| JP | 3-204721 | 9/1991 |
| JP | 6-342257 | 12/1994 |
| JP | 9-97170 | 4/1997 |
| JP | 9-325881 | 12/1997 |
| JP | 10-207695 | 8/1998 |
| JP | 11-95984 | 4/1999 |
| JP | 2000-105685 | 4/2000 |

* cited by examiner

*Primary Examiner*—Ellen Tran
(74) *Attorney, Agent, or Firm*—Oblon, Spivak, McClelland, Maier & Neustadt, P.C.

(57) ABSTRACT

Disclosed is a key generator, which assures the security of a key by preventing a circuit designer and other persons from readily knowing the value of the key. Random number generator circuits (51, 52, 53 and so on) generate random numbers respectively in accordance with different clocks (CLK1, CLK2, CLK3, and so on). An arithmetic circuit (59) operates on the random numbers generated from the random number generator circuits (51, 52, 53 and so on) to generate an N-bit random number RA as the output from a random number generator (50). This N-bit random number is RA acquired via a key selector (43), and latched into a key register (45) in accordance with an acquisition enable signal EN from a timing monitoring counter (47), which is driven by a clock CLKA other than clocks CLK1, CLK2, CLK3, and so on, to obtain a hardware key, which is a unique secret key.

9 Claims, 4 Drawing Sheets

KEY GENERATOR DEVICE, ENCODING/DECODING DEVICE, AND KEY GENERATION METHOD

TECHNICAL FIELD

The present invention relates to a key generator for generating key data, which serves as a secret key for data encryption (encoding) or decryption, an encryptor/decryptor apparatus equipped with such a key generator, and a method for key generation.

BACKGROUND ART

A system for receiving encrypted data delivered to a PC (personal computer) or other terminal via a recording medium or a communications network such as the Internet, entering the received data, for instance, into a recording/reproduction apparatus connected to the terminal, decrypting the entered data with an encryptor/decryptor apparatus within the recording/reproduction apparatus, and recording the decrypted data onto a recording medium is now considered.

FIG. 4 shows a typical encryptor/decryptor apparatus. The reference numeral 60 in the figure denotes an encryptor/decryptor processor, which represents a portion excluding the encryptor/decryptor apparatus's interface, CPU, and other components to be incorporated in the form of an IC (integrated circuit). The encryptor/decryptor processor 60 includes an encryptor/decryptor computing section 61, a key selector 62, a hardware key generator 64, and a key memory 69.

The hardware key generator 64 includes a ROM 65 in which fixed-value data is written; an arithmetic circuit 66 for inverting and shifting the bits of data read from the ROM 65, calculating the exclusive OR (EOR or XOR) of such bits, or otherwise operating on the data read from the ROM 65; and a latch circuit 67 for latching, at a time specified by an external command, the data generated from the arithmetic circuit 66 in accordance with a clock (CLK). The data output from the latch circuit 67 is entered into the key selector 62 as a hardware key.

Upon external command, the hardware key generated from the hardware key generator 64 is first selected by the key selector 62, and operated on in conjunction with input data in the encryptor/decryptor computing section 61 for performing calculations to produce a first-step process key, which is then written into the key memory 69.

Next, the first-step process key is read from the key memory 69, selected by the key selector 62, and operated on in conjunction with the input data in the encryptor/decryptor computing section 61 for performing calculations to produce a second-step process key, which is then written into the key memory 69 in replacement of the first-step process key.

In the encryptor/decryptor computing section 61, a third-step process key and subsequent process keys are then calculated. Finally, a contents key, which is a secret key for data encryption or decryption, is calculated and written into the key memory 69.

If, in the resulting state, a command for selecting a decryption mode is entered and ciphertext data is entered as input data, the contents key read from the key memory 69 is selected by the key selector 62, and operated on in conjunction with the ciphertext data in the encryptor/decryptor computing section 61 to decrypt the ciphertext data. As a result, the encryptor/decryptor computing section 61 outputs plain text data.

If, on the other hand, a command for selecting an encryption mode is entered and plain text data is entered as input data, the plain text data is encrypted similarly, and the encryptor/decryptor computing section 61 outputs ciphertext data.

However, the use of the aforementioned encryptor/decryptor apparatus, that is, the encryptor/decryptor processor 60, permits a circuit designer or other similar specialist to readily know the value of the hardware key by viewing the RTL (register transfer level) description of the hardware key generator 64 included in the circuitry.

It is therefore necessary to pay careful attention to design file management at the RTL in order to ensure the secrecy of the hardware key, which is used as a unique secret key. However, since it is difficult to take all possible security measures, it is not easy to ensure the secrecy of the hardware key for security assurance.

It is therefore an object of the present invention to provide means for generating key data in such a manner as to ensure security.

DISCLOSURE OF THE INVENTION

The key generator of the present invention includes:
a plurality of random number generation means for generating random numbers that vary respectively at predetermined independent intervals; and
an arithmetic processing means for receiving various random numbers output from the above plurality of random number generation means and performing a predetermined arithmetic process on the received plurality of random numbers.

The encryptor/decryptor apparatus of the present invention includes:
a plurality of random number generators for generating random numbers that vary respectively at predetermined independent intervals;
a key generation means comprising an arithmetic processor for receiving various random numbers output from the above plurality of random number generation means and performing a predetermined arithmetic process on the received plurality of random numbers; and
an encryption/decryption means for performing an encryption or decryption process on the received input data in accordance with first-step key information generated by the above key generation means.

The key generation method of the present invention includes the steps of:
generating a plurality of random numbers at predetermined different intervals; and
performing a predetermined arithmetic process on the plurality of random numbers, which are generated at the above different intervals, and outputting the processed random numbers.

When the above key generator, encryptor/decryptor apparatus, and key generation method is used, the output data generated by the random number generation means varies chronologically. Therefore, it is impossible for the circuit designer and other persons to know the value of the actual key data that is latched by a latching means. As a result, key data security is assured.

BEST MODE FOR CARRYING OUT THE INVENTION

Figure 1:
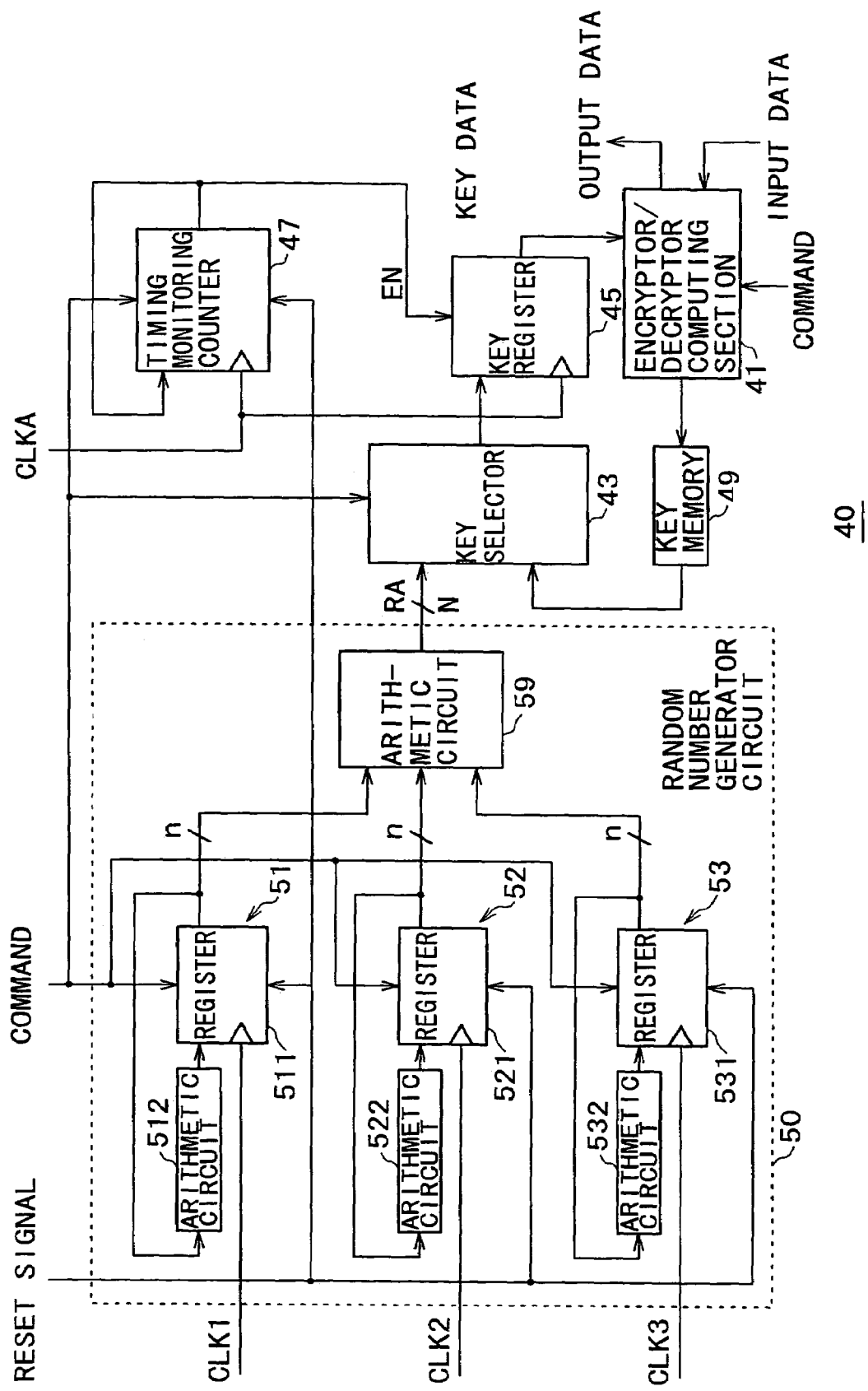
FIG. 1 is a diagram illustrating one embodiment of an encryptor/decryptor apparatus according to the present invention, which includes one embodiment of a key generator according to the present invention.
Figure 2:
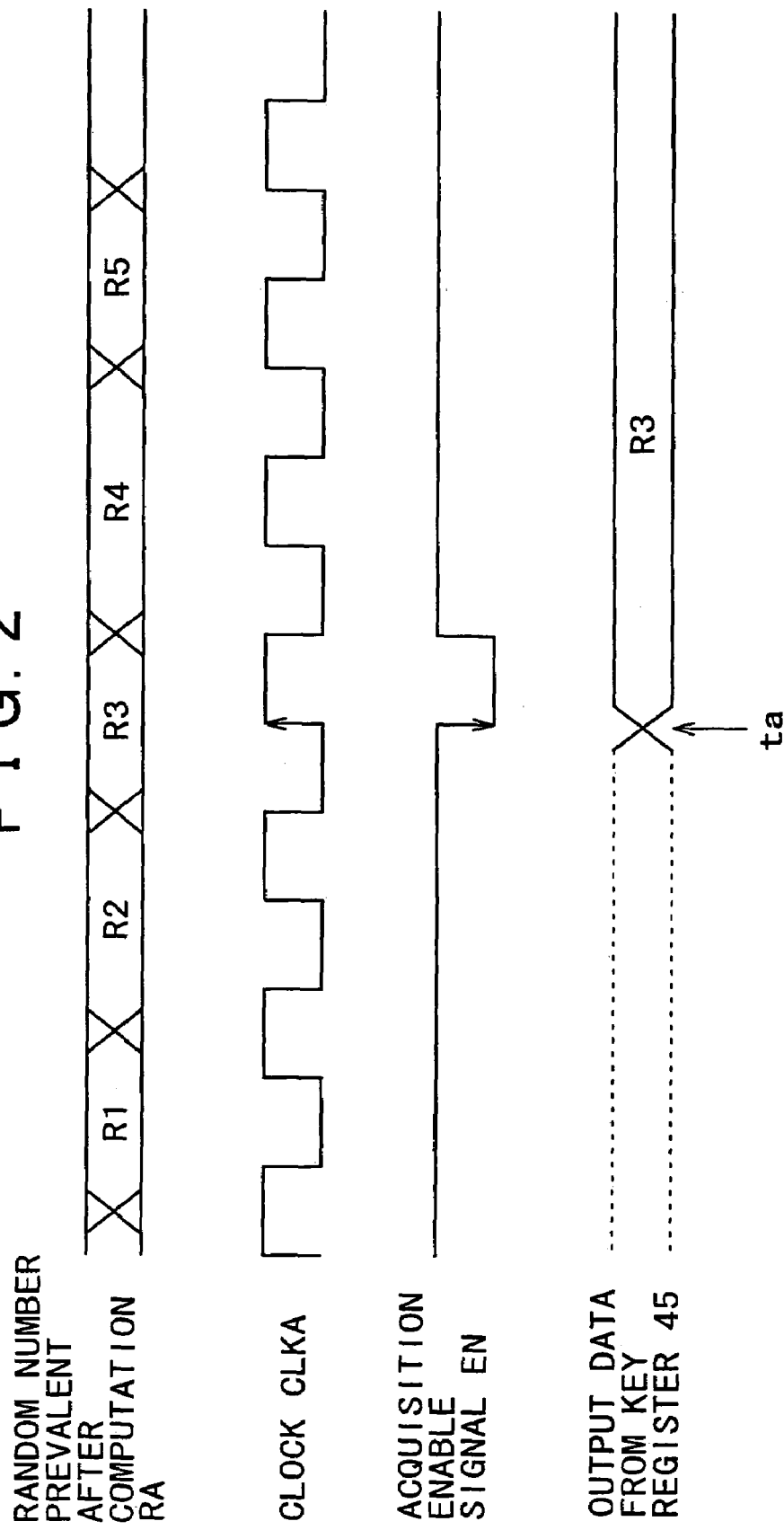
FIG. 2 is a diagram illustrating the operation of the key generator shown in FIG. 1.

Embodiment Of a Key Generator and Encryptor/Decryptor Apparatus: FIGS. 1 and 2

FIG. 1 illustrates one embodiment of an encryptor/decryptor apparatus according to the present invention, which includes one embodiment of a key generator according to the present invention.

An encryptor/decryptor processor 40 represents a portion excluding the encryptor/decryptor apparatus's interface, CPU, and other components to be incorporated in the form of an IC as described later, and includes a random number generator 50, which serves as a hardware key generator, an encryptor/decryptor computing section 41, a key selector 43, a key register 45, a timing monitoring counter 47, and a key memory 49.

The random number generator 50 includes a plurality of random number generator circuits and arithmetic circuits 59. The figure shows three random number generator circuits 51-53. In reality, however, a larger number of random number generator circuits are furnished.

Random number generator circuit 51 includes a register 511 and an arithmetic circuit 512. From the outside of the encryptor/decryptor processor 40, a command, reset signal, and clock CLK1 are entered into the register 511. In the arithmetic circuit 512, the output data of the register 511 is operated on, for instance, by inverting and shifting all output data bits of the register 511 to calculate the exclusive OR of each bit. The resulting computed data is then written into the register 511 in accordance with clock CLK1. The above operation is repeatedly performed on each pulse of clock CLK1. As a result, the register 511 outputs an n-bit (e.g., 8-bit) random number, which varies from one pulse of clock CLK1 to another.

Random number generator circuit 52 includes a register 521 and an arithmetic circuit 522. As is the case with random number generator circuit 51, the register 521 of random number generator circuit. 52 outputs an n-bit random number, which varies from one pulse of clock CLK2 to another. Random number generator circuit 53 includes a register 531 and an arithmetic circuit 532. As is the case with random number generator circuits 51 and 52, the register 531 of random number generator circuit 53 outputs an n-bit random number, which varies from one pulse of clock CLK3 to another. Clock CLK3 differs from clocks CLK1 and CLK2. The same holds true for the other random number generator circuits, which are not shown in the figure.

Arithmetic circuit 59 in the random number generator 50 not only combines the random numbers generated by random number generator circuits 51, 52, 53, and so on to generate an N-bit random number (e.g., 64-bit random number if n=8 and the total number of random number generator circuits is 8) but also generates N-bit random number RA by operating on the above combined N-bit random number, for instance, by inverting and shifting all bits of the combined random number to calculate the exclusive OR of each bit.

The random numbers generated by random number generator circuits 51, 52, 53, and so on vary with mutually different clocks CLK1, CLK2, CLK3, and so on. Therefore, random number RA, which is output from the random number generator 50, varies with irregular timing as indicated by data R1, R2, R3, R4, R5, and so on in FIG. 2.

Random number RA, which is output from the random number generator 50, enters the key selector 43. The key selector 43 is controlled by an input command so as to select either random number RA or the key data read from the key memory 49 as described later. The data selected in this manner then enters the key register 45.

Meanwhile, the timing monitoring counter 47 resets upon receipt of an input command or reset signal and counts, from the beginning, clock CLKA, which differs from the aforementioned random number generation clocks CLK1, CLK2 and CLK3. When a predetermined count is reached, the timing monitoring counter 47 outputs an acquisition enable signal EN.

The key register 45 acquires the prevalent output data generated from the key selector 43 in accordance with clock CLKA that is prevalent when the acquisition enable signal EN is output, and then outputs key data.

Therefore, when random number RA, which is output from the random number generator 50, is to be selected as the output data from the key selector 43, data R3, which is prevalent at time ta at which the acquisition enable signal EN is output, is latched by the key register 45 and output as a hardware key while random number RA varies with irregular timing as indicated by data R1, R2, R3, R4, R5, and so on in FIG. 2.

In the encryptor/decryptor computing section 41, the data selected by the key selector 43 and latched by the key register 45 as described above is handled as key data and operated on in conjunction with the input data to calculate a process key. Eventually, a contents key is calculated. The contents key is then used to decrypt or encrypt data in accordance with the DES (Data Encryption Standard), TripleDES, or other cryptographic algorithm.

More specifically, the key selector 43 first selects random number RA, which is output from the random number generator, upon receipt of an input command. The selected random number is then latched by the key register 45 as described above, and a hardware key is obtained as the key data for the output of the key register 45. The encryptor/decryptor computing section 41 operates on the obtained hardware key in conjunction with the input data so as to calculate a first-step process key, which is then written into the key memory 49.

Next, the first-step process key read from the key memory 49 is selected by the key selector 43 and latched by the key register 45. The first-step process key is then obtained as the key data output from the key register 45. The encryptor/decryptor computing section 41 operates on the obtained first-step process key in conjunction with the input data to calculate a second-step process key, which is then written into the key memory 49 in replacement of the first-step process key.

In the encryptor/decryptor computing section 41, a third-step and subsequent process keys are then calculated in like manner. Finally, a contents key is calculated and written into the key memory 49.

If, in the resulting state, a command for selecting a decryption mode is entered and ciphertext data is entered as input data, the contents key read from the key memory 49 is selected by the key selector 43 and latched by the key register 45 to obtain the contents key as the key data for the output from the key register 45. The encryptor/decryptor computing section 41 then operates on the obtained contents key in conjunction with the ciphertext data to decrypt the ciphertext data so that the encryptor/decryptor computing section 41 outputs plain text data.

If, on the other hand, a command for selecting an encryption mode is entered and plain text data is entered as input data, the plain text data is encrypted similarly, and the encryptor/decryptor computing section 41 outputs ciphertext data.

In the key generator described above, the output data generated by random number generator circuits 51, 52, 53, and so on vary chronologically, and random number RA, which is output from the random number generator 50, varies with irregular timing. Therefore, it is impossible for the circuit designer and other persons to know the value of the actual hardware key acquired by the key register 45 simply by viewing the RTL description on a circuit diagram. As a result, hardware key security is assured.

Further, a random number name is assigned to each register within the apparatus as a register name, and each bit is scrambled at all nodes concerning the hardware key. This prevents the circuit designer and other persons from reading the true hardware key value even if they successfully reads the value of a register within the apparatus. This provides an increased degree of security.

Figure 3:
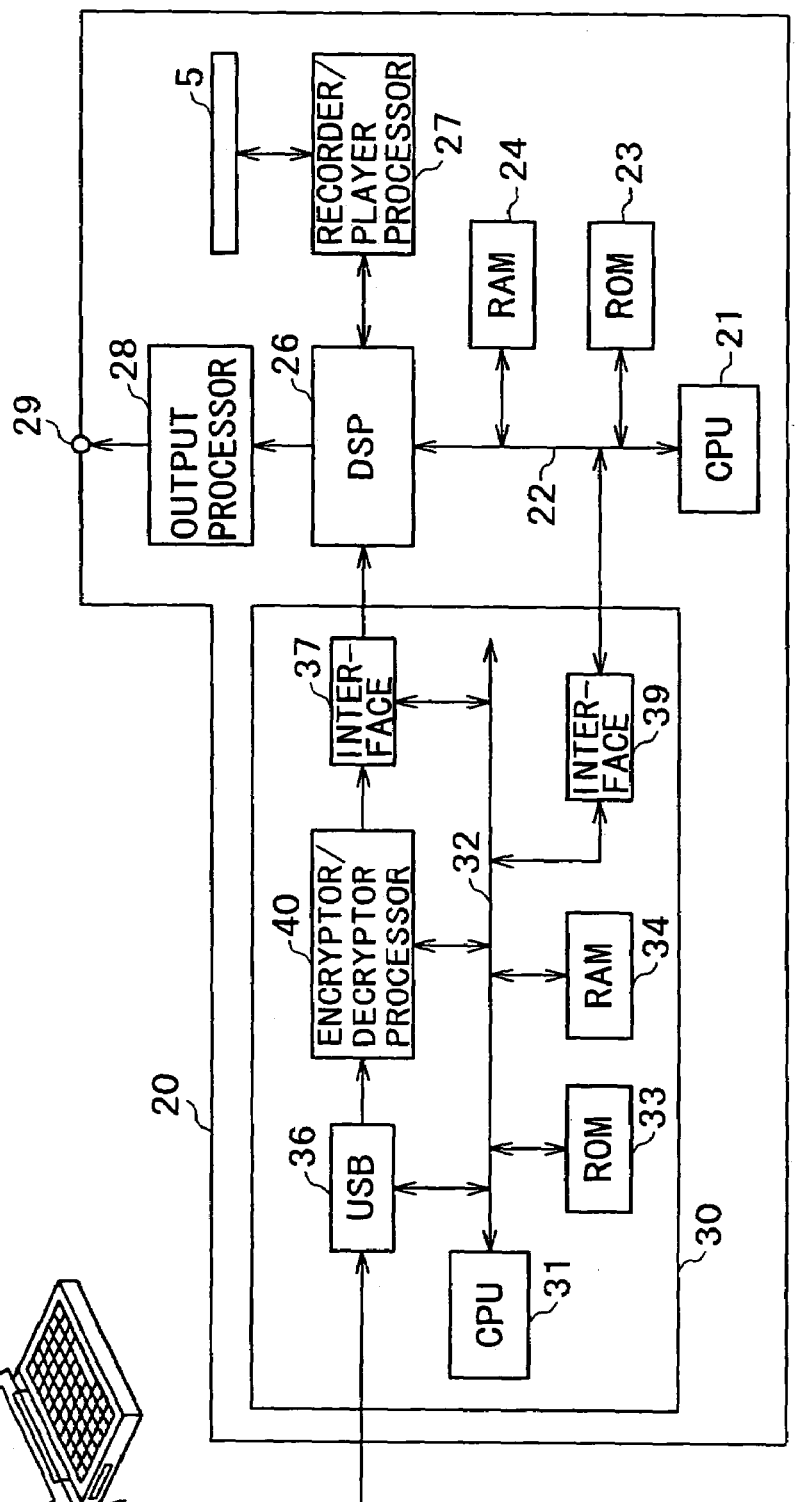
FIG. 3 is a diagram illustrating a recording/reproduction apparatus as one embodiment of a data receiver according to the present invention.
Figure 4:
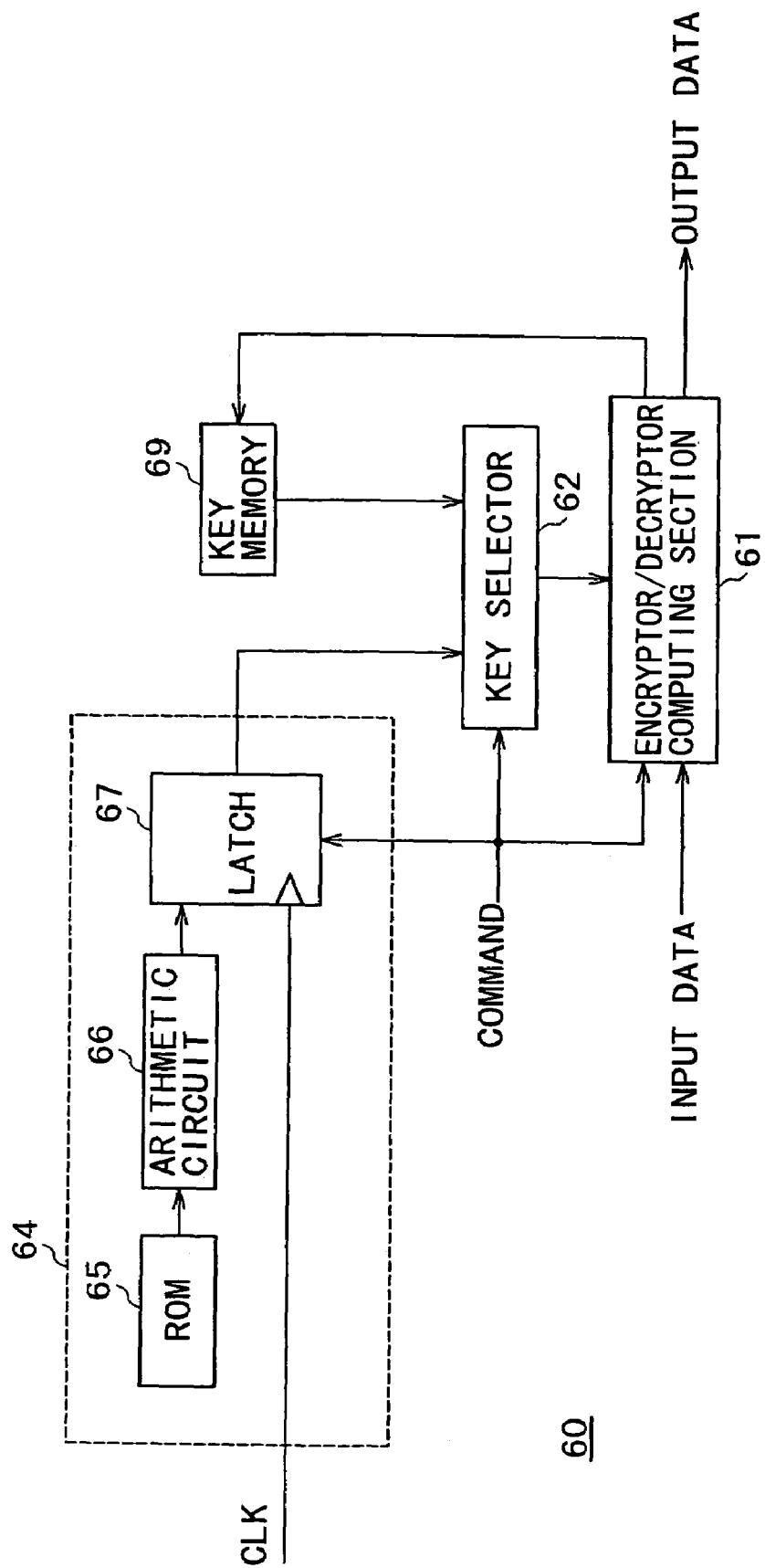
FIG. 4 is a diagram showing a possible example of a key generator and encryptor/decryptor apparatus.

Embodiment Of a Data Receiver: FIG. 3

FIG. 3 illustrates a data receiver system that includes an encryptor/decryptor apparatus of the present invention and includes a recording/reproduction apparatus as one embodiment of a data receiver according to the present invention.

The data receiver system exemplified in the figure receives data that is encoded and encrypted with a secret key at a PC or other terminal 10 and made available by means of ripping from a recording medium 1 or downloading from an Internet-based distribution system 2.

The received ciphertext is transmitted from the terminal 10 to a recording/reproduction apparatus 20 that is connected to a USB (universal serial bus) connector on the terminal 10.

The recording/reproduction apparatus 20 records data on a recording medium 5, plays the data back from the recording medium 5, and is provided with an encryptor/decryptor apparatus 30.

The encryptor/decryptor apparatus 30 includes the aforementioned encryptor/decryptor processor 40 shown in FIG. 1 and a CPU 31. A bus 32 for the CPU 31 is connected to a ROM 33 in which programs to be executed by the CPU 31 for exchanging commands and performing an encryption/decryption process, fixed data, and other data are written, a RAM 34 that functions, for instance, as a work area for the CPU 31, a USB interface 36 for exchanging commands with the terminal 10 and acquiring data from the terminal 10, an interface 37 for transferring data out to a DSP (digital signal processor) 26 in a main unit of the recording/reproduction apparatus, and an interface 39 for exchanging commands with the CPU 21 in the recording/reproduction apparatus main unit.

The encryptor/decryptor 30 is formed as a one-chip LSI (large-scale integrated circuit).

In the recording/reproduction apparatus main unit, a bus 22 for the CPU 21 is connected to a ROM 23 in which programs to be executed by the CPU 21, fixed data, and other data are written, a RAM 24 that functions, for instance, as a work area for the CPU 21, and the aforementioned DSP 26. The DSP 26 is connected to a recording/reproduction processor 27 and an output processor 28.

Within the encryptor/decryptor 30, data acquired from the terminal 10 via the USB interface 36, which is encoded, and encrypted with a secret key, is decrypted with a contents key in the encryptor/decryptor processor 40 as described earlier, and the resulting encoded data, which is decrypted plain text data, is transmitted to the DSP 26 via interface 37, processed by the DSP 26, and recorded onto a recording medium 5 by the recording/reproduction processor 27 or converted to an analog signal by the output processor 28 and delivered to an output connector 29.

Acceptable recording media 5 includes an optical disk, hard disk, flexible disk, magnetic tape, memory card, and semiconductor memory.

The present invention can be applied not only to the foregoing recording/reproduction apparatus but also to an apparatus that receives encrypted data, decrypts it, plays it back, and does not have a recording function.

As described above, the present invention properly assures key data security.

The invention claimed is:

1. A key generator, comprising:
a plurality of random number generation means for generating random numbers that vary respectively at predetermined chronologically independent intervals; and
an arithmetic processing means for receiving various random numbers output from said plurality of random number generation means and performing a predetermined arithmetic process on the received said plurality of random numbers.

2. The key generator according to claim 1, wherein each of said plurality of random number generation means comprises a data computation means for performing a predetermined process on entered input data and outputting the processed input data; and a data retention means for acquiring and retaining the output data from said data computation means in compliance with an acquisition instruction which is independently given by each of said plurality of random number generation means and entering the output data, which is acquired and retained in compliance with said acquisition instruction, into said data computation means.

3. The key generator according to claim 2, wherein said data computation means performs at least one of a bit inversion process, a shift process, and an exclusive-OR process on a bit string of entered input data.

4. The key generator according to claim 1, wherein the data length of key information generated by said arithmetic processing means is greater than the data length of random numbers output from said random generation means.

5. An encryptor/decryptor apparatus, comprising:
a plurality of random number generation means for generating random numbers that vary respectively at predetermined chronologically independent intervals;
a key generation means comprising an arithmetic processor for receiving various random numbers output from said plurality of random number generation means and performing a predetermined arithmetic process on the received plurality of random numbers; and
an encryption/decryption means for performing an encryption or decryption process on the received input data in accordance with first key information generated by said key generation means.

6. The encryptor/decryptor apparatus according to claim 5, wherein each of said random number generation means comprises a data computation means for performing a predetermined process on entered input data and outputting the processed input data; and a data retention means for acquiring and retaining the output data from said data computation means in compliance with an acquisition instruction which is independently given by each of said plurality of random number generation means and entering the output data, which is acquired and retained in compliance with said acquisition instruction, into said data computation means.

7. The encryptor/decryptor apparatus according to claim 5, further comprising:
- a key retention means for retaining entered input data as second key information; and
- a key selection means for selectively outputting first key information generated by said key generation means or second key information retained by said key retention means,
- wherein said encryptor/decryptor processor performs an encryption or decryption process in accordance with key information selected by said key selection means.

8. A key generation method, comprising the steps of:
- generating a plurality of random numbers at respectively predetermined chronologically different intervals; and
- performing a predetermined arithmetic process on said plurality of random numbers generated at different intervals, and outputting the processed random numbers.

9. A key generator, comprising:
- a plurality of random number generation means for generating random numbers that vary respectively at predetermined chronologically and asynchronously independent intervals; and
- an arithmetic processing means for receiving various random numbers output from said plurality of random number generation means and performing a predetermined arithmetic process on the received said plurality of random numbers.

* * * * *